(12) United States Patent
Lee et al.

(10) Patent No.: US 10,418,245 B2
(45) Date of Patent: Sep. 17, 2019

(54) METHOD FOR INTEGRATED CIRCUIT MANUFACTURING WITH DIRECTED SELF-ASSEMBLY (DSA)

(71) Applicant: Taiwan Semiconductor Manufacturing Co., Ltd., Hsinchu (TW)

(72) Inventors: Chih-Jie Lee, Hsinchu (TW); Joy Cheng, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 51 days.

(21) Appl. No.: 15/664,222

(22) Filed: Jul. 31, 2017

(65) Prior Publication Data
US 2019/0035630 A1    Jan. 31, 2019

(51) Int. Cl.
*H01L 21/033* (2006.01)
*G06F 17/50* (2006.01)
(Continued)

(52) U.S. Cl.
CPC ............ *H01L 21/0338* (2013.01); *G03F 1/36* (2013.01); *G06F 17/5009* (2013.01);
(Continued)

(58) Field of Classification Search
CPC ............ H01L 21/0337; H01L 21/0338; H01L 21/0274; H01L 21/308; H01L 21/32; H01L 21/02118; H01L 21/0272; H01L 21/02356; H01L 21/0271; G06F 17/5009; G06F 17/5081; G06F 2217/12; G03F 1/36
See application file for complete search history.

(56) References Cited

U.S. PATENT DOCUMENTS 7,987,436 B2    7/2011 Jessen et al.
8,336,003 B2    12/2012 Cheng et al.
(Continued)

OTHER PUBLICATIONS

Guo et al., "Density Driven Placement of Sub-DSA resolution assistant features (SDRAFs)", Pro. SPIE 10148, Design-Process-Technology Co-optimization for Manufacturability XI, 101480E, San Jose, CA, 7 pages. Feb. 26, 2017.
(Continued)

*Primary Examiner* — Jasmine J Clark
(74) *Attorney, Agent, or Firm* — Haynes and Boone, LLP

(57) ABSTRACT

A method includes receiving a first target pattern of an integrated circuit (IC) that includes two first target features and two second target features. The method further includes deriving a second target pattern based on the first target pattern and a directed self-assembly (DSA) process, wherein the first target pattern is to be produced by a process that includes performing the DSA process with a guide pattern derived from the second target pattern. The second target pattern includes a third feature and a fourth feature. The third feature is designed for producing the two first target features with the DSA process, and the fourth feature is designed for producing the two second target features with the DSA process. The method further includes inserting one or more sub-DSA-resolution assistant features (SDRAF) into the second target pattern, the one or more SDRAF connecting the third and fourth features.

20 Claims, 6 Drawing Sheets

(51) Int. Cl.
  H01L 21/027 (2006.01)
  H01L 21/02 (2006.01)
  G03F 1/36 (2012.01)

(52) U.S. Cl.
  CPC ...... *G06F 17/5081* (2013.01); *H01L 21/0274* (2013.01); *H01L 21/02118* (2013.01); *H01L 21/02356* (2013.01); *H01L 21/0337* (2013.01); *G06F 2217/12* (2013.01); *H01L 21/0271* (2013.01)

(56) References Cited

U.S. PATENT DOCUMENTS

| | | |
|---|---|---|
| 9,530,660 B2 | 12/2016 | Tseng et al. |
| 9,576,817 B1* | 2/2017 | Cheng ................ H01L 21/0271 |
| 9,672,320 B2 | 6/2017 | Chang et al. |
| 2015/0227676 A1* | 8/2015 | Robles ................ G06F 17/5081 716/54 |

OTHER PUBLICATIONS

Yi et al., "Experimental Study of Sub DSA resolution Assist Features (SDRAF)", Proc. SPIE 9423, Alternative Lithographic Technologies VII, 94231F, 8 pages. Feb. 22, 2015.

Weng et al., Directed Self-Assembly Process with Size-Restricted Guiding Patterns, U.S. Appl. No. 15/197,467, filed Jun. 29, 2016, 47 pages.

Wu et al., "Method for Improving Circuit Layout for Manufacturability", U.S. Appl. No. 15/411,613, filed Jan. 20, 2017, 46 pages.

* cited by examiner

METHOD FOR INTEGRATED CIRCUIT MANUFACTURING WITH DIRECTED SELF-ASSEMBLY (DSA)

BACKGROUND

As conventional lithography (193i) has reached its limit due to continuously shrinking feature size, alternative approaches have emerged. Among the alternative approaches, directed self-assembly (DSA) has been proven as a promising candidate to generate periodic patterns in a large area, such as contact holes or vias holes in a contact layer of an integrated circuit (IC). These patterns are usually small, presenting challenges to conventional fabrication processes. In a typical DSA process, a guide pattern (also called a template) is formed over a wafer by a lithography process, and then a block copolymer is deposited into the guide pattern and annealed to form polymeric cylinders. The polymeric cylinders are then used for further processing the wafer, for example, to form contact holes.

However, existing manufacturing flows based on DSA are not completely satisfactory. For example, the shape and size of guide patterns are usually not optimized for the DSA process. For another example, even though sub-resolution assistant features (SRAF) have been used in the past to improve photolithography performance, the use and design of such SRAF have not been optimized for the DSA process. Improvements in these areas are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
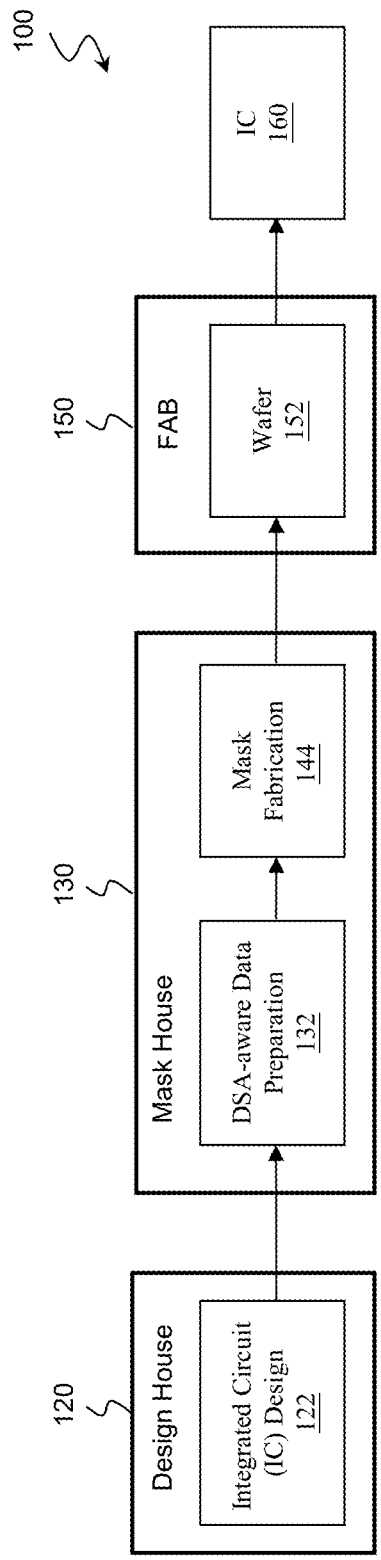
FIG. 1 is a simplified block diagram of an embodiment of an integrated circuit (IC) manufacturing system and an associated IC manufacturing flow with DSA awareness.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to methods for manufacturing semiconductor devices, and more particularly to methods of preparing design data with DSA-awareness for mask fabrication. According to some embodiments of the present disclosure, DSA-aware guide patterns (at the mask fabrication stage) are no longer restricted to conventional shapes such as rectangular or other regular shapes. Rather, they can have irregular shapes and can even be connected into a net shape. In some embodiments of the present disclosure, the shape and size of the guide patterns are determined in an iterative process. The iterative process takes into account the characteristics of the DSA process including the block copolymer used by the DSA process, and adjusts the shape and size of the guide patterns in a series of simulations until the DSA patterns closely match the target patterns. In a further embodiment, the guide patterns are connected by sub-DSA resolution assistant features (SDRAF). The SDRAF may be printable onto a wafer, but they are ineffective in forming DSA patterns. The SDRAF can help enlarge the process window when forming the guide patterns using photolithography processes.

FIG. 1A is a simplified block diagram of an embodiment of an integrated circuit (IC) manufacturing system 100 and an IC manufacturing flow associated with the IC manufacturing system, constructed according to aspects of the present disclosure. The IC manufacturing system 100 includes a plurality of entities, such as a design house (or design team) 120, a mask house (or mask team) 130, and an IC manufacturer (or fab) 150, that interact with one another in the design, development, and manufacturing cycles and/or services related to manufacturing an integrated circuit (IC) device 160. Particularly, the mask house 130 prepares mask data and masks with DSA awareness, and the fab 150 manufactures wafers using one or more DSA processes. The plurality of entities are connected by a communications network, which may be a single network or a variety of different networks, such as a private intranet and/or the Internet, and may include wired and/or wireless communication channels. Each entity may interact with other entities and may provide services to and/or receive services from the other entities. One or more of the design house 120, the mask house 130, and the fab 150 may be owned by a single company, and may even coexist in a common facility and use common resources.

The design house 120 generates an IC design layout 122, also referred to as a target layout 122 in the present disclosure. The target layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the target layout 122 may include various IC features, such as active regions, gate electrodes, source and drain regions, metal lines, contact holes, contact plugs, via holes, via plugs, and openings for bonding pads, to be formed in a semiconductor substrate (such as a silicon wafer) and various material layers disposed on the semiconductor substrate. The target layout 122 is presented in one or more data files having information of the geometrical patterns. For example, the target layout 122 can be expressed in a GDSII file format or DFII file format.

Figure 3C:
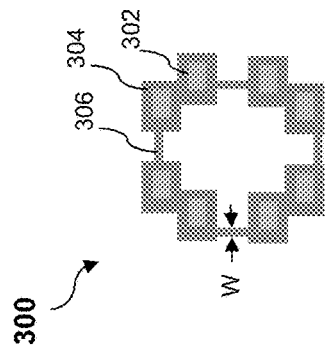
FIGS. 3A, 3B, 3C, 3D, 3E, 3F, 3G, and 3H illustrate some design patterns at various stages of DSA-aware design flow, in accordance with some embodiments.
Figure 3B:
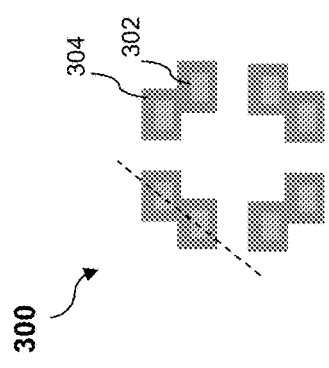
Figure 3A:
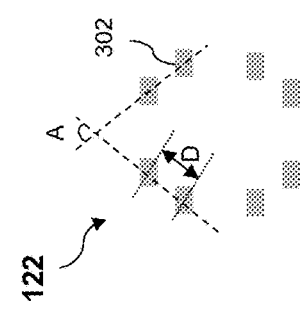

In a particular example, a layer of the target layout 122 includes some IC target features that are suitable to be fabricated using DSA process(es), such as a plurality of small-sized contact holes or via holes 302 (referred to as the target holes 302) as shown in FIG. 3A. Referring to FIG. 3A, the target holes 302 are closely packed in this example. Particularly, there are multiple pairs of the target holes 302. The distance D between the geometric centers of two target holes 302 in a pair is designed to closely match the characteristic length (Lo) of a polymeric material used in a DSA process by the fab 150 (FIG. 1). In a typical DSA process, a block copolymer (BCP) film having constituent polymers is formed over lithographically defined surfaces, and a microphase separation is induced to cause the constituent polymer molecules to self-assemble, thus creating densely packed features with highly uniform dimensions and shapes. Typically, the constituent polymer molecules self-assemble into cylindrical shapes in a periodic pattern with a period of Lo, which is referred to as the characteristic length of the BCP. The size (e.g., the radius) of the cylindrical shapes and the characteristic length Lo can be designed by selecting the appropriate molecular weights of the constituent polymers and the ratio between the constituent polymers. In some embodiments of the present disclosure, the distance D in the target pattern 122 is designed to be in a range from 95% to 105% of the characteristic length Lo. Example BCP materials include poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl(meth)acrylate), poly(methyl methacrylate-b-t-butyl methacrylate), poly(ethylene oxide-b-propylene oxide), poly(styrene-b-tetrahydrofuran), and combinations of the foregoing block copolymers.

Further in this embodiment, the center line of a pair (the imaginary dashed line in FIG. 3A that goes through geometric centers of the target holes 302 in a pair) forms an angle A with the center line of an adjacent pair. The angle A is an acute angle in this embodiment. Experiments have shown that traditional lithography processes, even some existing DSA processes, may have some difficulty in forming a pattern like this. Embodiments of the provided DSA-aware data preparation work particularly well for such patterns, providing high pattern fidelity during fabrication. The provided subject matter also works well for other types of patterns, including ones where the center lines of adjacent pairs of the target holes 302 are parallel. Further, even though the target holes 302 are illustrated as rectangular, they can be of other shapes such as circle, ellipse, and hexagon in various embodiments.

Referring back to FIG. 1, the mask house 130 uses the target layout 122 to fabricate one or more masks to be used for manufacturing the various layers of the IC device 160.

The mask house 130 performs various tasks, including a DSA-aware data preparation 132 and, optionally, a mask fabrication 144. In the DSA-aware data preparation 132, the target layout 122 is converted into a target pattern that is suitable for use by a manufacturing process including DSA. More details of the DSA-aware data preparation 132 will be discussed with reference to FIG. 2. The target pattern produced by the DSA-aware data preparation 132 is translated into a form that can be physically written by a mask writer.

In the mask fabrication 144, the design layout so prepared is modified to comply with a particular mask manufacturer and is then fabricated. For example, an electron-beam (e-beam) or a mechanism of multiple e-beams is used to form a pattern on a mask (photomask or reticle) based on the target pattern. The mask can be formed in various technologies. In an embodiment, a mask pattern includes opaque regions and transparent regions. A radiation beam, such as an ultraviolet (UV) beam, used to expose a photo-sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art. In the present embodiment, the DSA-aware data preparation 132 and the mask fabrication 144 are illustrated as separate element. However, they can be collectively referred to as mask data preparation.

The fab 150, such as a semiconductor foundry, uses the mask (or masks) fabricated by the mask house 130 to manufacture the IC device 160. Alternatively, the fab 150 may use data prepared by the mask house 130 to manufacture the IC device 160 using some maskless lithography technology, such as electron beam direct write (EBDW) lithography. The fab 150 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is manufactured to form the IC device 160 using one or more photolithography processes such as deep ultraviolet (DUV) lithography, immersion lithography, extreme ultraviolet (EUV) lithography, electron beam lithography, x-ray lithography, ion beam lithography, and other suitable lithography techniques. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes. In one particular example, the mask is used to form DSA guide patterns (e.g., DSA guide trenches) on the wafer. To further this example, the fab 150 performs a DSA process that includes coating a block copolymer over the guide patterns and inducing microphase separation in the block copolymer to form constituent polymers. The coating of the block copolymer may include depositing the block copolymer into the DSA guide trenches. The fab 150 may etch the wafer (e.g., a hard mask layer of the wafer) using one of the constituent polymers as an etch mask to form circuit features for the IC 160, such as contact holes or via holes.

Figure 2:
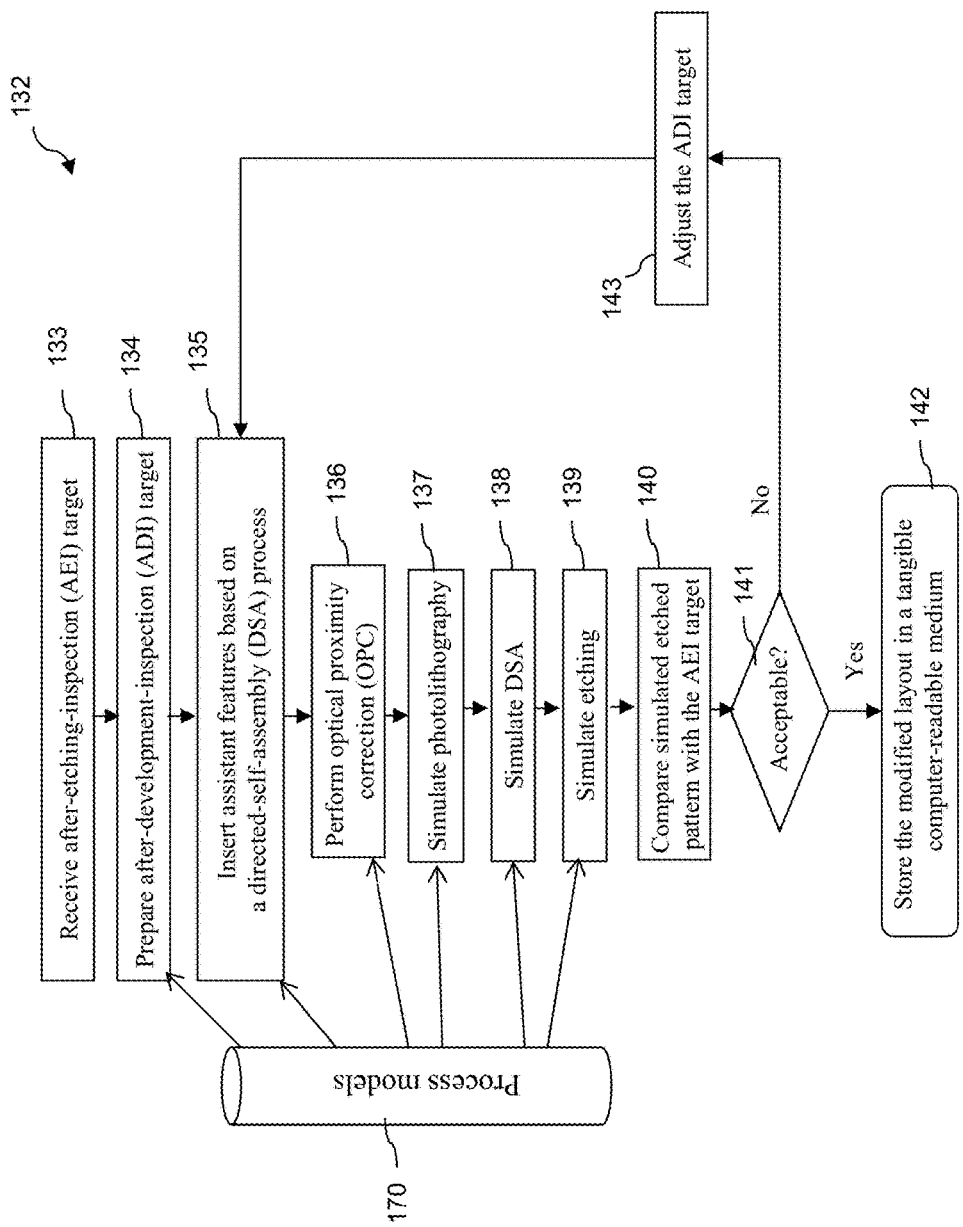
FIG. 2 is a more detailed block diagram of DSA-aware design flow according to various aspects of the present disclosure.

The DSA-aware data preparation 132 performs various tasks, some of which are further illustrated in FIG. 2. Referring to FIG. 2, in the present embodiment, the DSA-aware data preparation 132 includes an operation 133 that receives a target circuit pattern (referred to as an after-etching-inspection (AEI) target pattern) that should match the target layout 122; an operation 134 that prepares an after-development-inspection (ADI) target pattern based on the AEI target pattern; an operation 135 that inserts sub-DSA-resolution assistant features (SDRAF) into the ADI target pattern; an operation 136 that performs optical proximity correction (OPC) to the SDRAF-inserted ADI target pattern; an operation 137 that simulates photolithography process of the OPC-modified target pattern; an operation 138 that simulates a DSA process using a guide pattern resulted from the operation 137; an operation 139 that simulates an etching process; and an operation 140 that compares the AEI target pattern with simulated AEI pattern resulted from the operation 139. If the AEI target pattern matches the simulated AEI pattern within an acceptable margin (checked by an operation 141), the OPC-modified target pattern is stored (by an operation 142) in a tangible computer-readable medium for the mask fabrication 144 or other IC processing facilities. Otherwise, the ADI target pattern is adjusted (by an operation 143), and the adjusted ADI pattern is fed back to the operation 135. The above operations of the DSA-aware data preparation 132 repeat iteratively until the operation 141 finds the resultant layout pattern acceptable.

The various operations of the DSA-aware data preparation 132 receive inputs from a process model 170. The process model 170 may be based on actual processing parameters of the fab 150. The processing parameters can include parameters associated with various processes of the IC manufacturing cycle, parameters associated with tools used for manufacturing the IC, and/or other aspects of the manufacturing process. The process model 170 takes into account various process performance factors, such as intensity log slope (ILS), depth of focus (DOF), mask error enhancement factor (MEEF), critical dimension (CD) variation budget, overlay budget, rules on minimal area, minimal CD, minimal spacing, photoresist materials, etchants and etch selectivity, DSA materials including the characteristic length Lo, other suitable factors, or combinations thereof.

The various operations of the DSA-aware data preparation 132 are further described below in conjunction with FIGS. 3A-3H.

The operation 133 (FIG. 2) receives an AEI target pattern, which represents some IC features to be formed on a wafer. The AEI target pattern matches the target layout 122 or a subset thereof. One example of the AEI target pattern is shown in FIG. 3A, which has a plurality of target holes 302 as described above. The shape and size of patterns in the AEI target pattern should match (within an acceptable margin) those of the final IC features.

The operation 134 (FIG. 2) prepares an ADI target pattern 300 based on the AEI target pattern 122. The ADI target pattern 300 includes a plurality of patterns 304. In the present embodiment, the patterns 304 represent guide patterns (e.g., trenches) that are used during a DSA process. Further, the patterns 304 represent the guide patterns at the fabrication stage right after a photoresist layer has been exposed and developed. The fab 150 (FIG. 1) is going to perform a DSA process with the ADI target pattern 300 as the guide patterns to thereby form DSA patterns (e.g., self-assembled polymer cylinders), and then to etch a patterning layer on a wafer using the DSA patterns to obtain the AEI target pattern 122. In essence, the order of the operations 133 and 134 is the reverse of what actually happens in the fab 150.

In order to prepare the ADI target pattern 300, the operation 134 receives inputs from the process model 170 that include parameters associated with one or more etching processes and parameters associated with a DSA process including a block copolymer material used in the DSA process. It is noted that the target holes 302 are shown in FIG. 3B only as a reference point to show the relative positions of the ADI target patterns 304, and they are not actually in the ADI target pattern 300. In the present embodiment, the size of the patterns 304 is designed to be about the characteristic length Lo along the dashed center line. Further, two patterns 304 corresponding to a pair of the target holes 302 merge into a continuous pattern (referred to as a merged pattern 304) in the present embodiment.

The operation 135 (FIG. 2) inserts assistant features 306 based on the DSA process. Referring to FIG. 3C, the assistant features 306 are inserted between the merged patterns 304. In the present embodiment, the assistant features 306 are sub-DSA-resolution assistant features (SDRAF). In other words, DSA patterns will not be formed in areas corresponding to the assistant features 306. For example, the assistant features 306 may be designed to have a width W that is less than half of the characteristic length Lo. In various embodiments, the DSA process is designed to have a larger resolution than an optical (photolithography) process to be used for printing the ADI target pattern 300. In these embodiments, unlike traditional sub-optical-resolution assistant features, the assistant features 306 may be printable by the optical process. This effectively increases the process window for designing the assistant features 306 compared to traditional sub-optical-resolution assistant features.

Figure 3F:
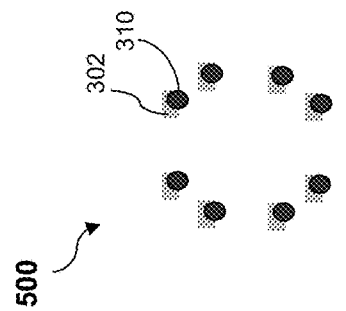
Figure 3E:
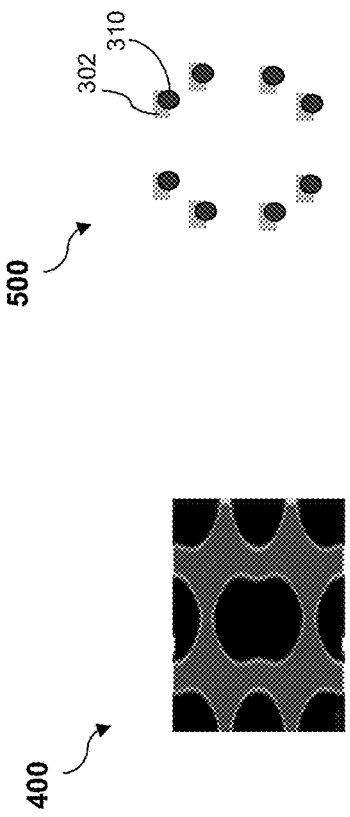
Figure 3D:
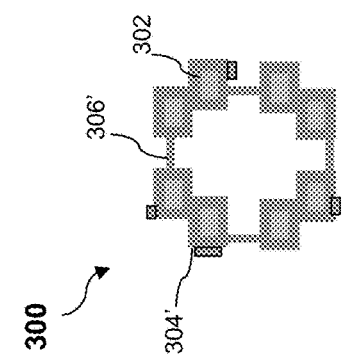
Figures 3G, 3H:
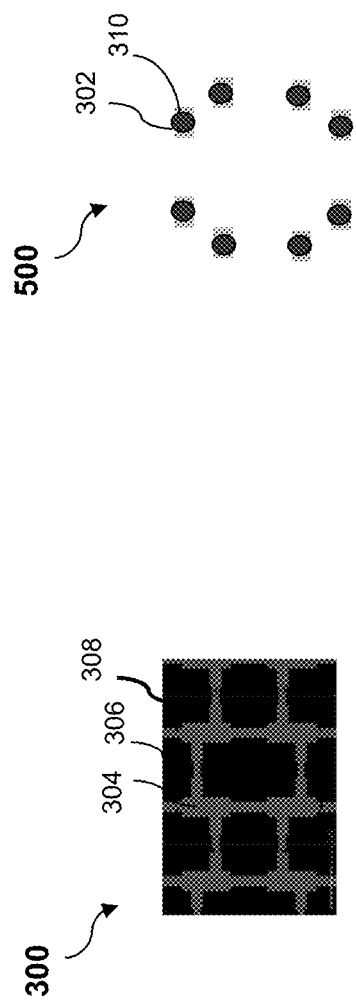

Further, in the present embodiment, the operation 135 inserts the assistant features 306 to connect the merged patterns 304 to form a net shape (not shown in FIG. 3C, but see FIG. 3G). This is different from traditional methods of inserting assistant features where the assistant features are inserted around a main pattern only for improving the printability of the main pattern. Here, the assistant features 306 are not only for improving the printability of the merged patterns 304, but also for increasing the uniformity of the printable patterns in the ADI target pattern 300. The increased uniformity in the ADI target pattern 300 helps improve various fabrication processes including photolithography and DSA (e.g., coating of the copolymer). During a DSA process, the difference in pattern density between central and peripheral regions of an IC block can affect the stability, controllability, and precision-positioning of the DSA process. When this pattern density difference is large, the DSA material tends to accumulate at the boundary of the IC block, causing problems in subsequent polymer self-assembly. By inserting the assistant features 306 to connect the merged patterns 304, the present embodiment effectively alleviates the pattern uniformity issue discussed above.

The operation 136 (FIG. 2) performs optical proximity correction (OPC) to the ADI target pattern 300 after the assistant patterns 306 have been inserted. The OPC uses lithography enhancement techniques to compensate for optical imaging errors, such as those that can arise from diffraction, interference, or other process effects. The OPC may employ model-based correction or rule-based correction. The OPC may add sub-optical resolution assistant features, such as scattering bars, serif, and/or hammerheads to the ADI target layout 300 according to optical models or rules such that, after a lithography process, a final pattern on a wafer is improved with enhanced resolution and precision. The OPC process may modify the contours of the merged patterns 304, the assistant patterns 306, or both. For the convenience of discussion, the OPC-modified ADI target patterns 304 are referred to as the OPC patterns 304', and the OPC-modified assistant patterns 306 are referred to as the OPC patterns 306', as shown in FIG. 3D. The operation 136 may include further resolution enhancement techniques (RET), such as off-axis illumination, phase-shifting masks, other suitable techniques, or combinations thereof.

The operation 137 (FIG. 2) simulates the photolithography process with the OPC-modified ADI target pattern 300 as an input to produce a simulated contour 400 (FIG. 3E). The simulation also takes inputs from the process model 170 that may include parameters associated with various processes of the IC manufacturing cycle, parameters associated with tools used for manufacturing the IC, and/or other aspects of the manufacturing process. For example, the simulation may take into account various process performance factors, such as intensity log slope (ILS), depth of focus (DOF), mask error enhancement factor (MEEF), other suitable factors, or combinations thereof. The simulated contour 400 represents the shape of a resist pattern after a resist layer is exposed with a latent image of the OPC-modified ADI target pattern 300 and subsequently developed. In other words, the simulated contour 400 is a simulated ADI pattern 400.

The operation 138 (FIG. 2) simulates the DSA process with the simulated ADI pattern 400 as an input. For example, the operation 138 uses the simulated ADI pattern 400 as a guide pattern, simulates the process of coating a block copolymer over the simulated ADI pattern 400, and simulates the polymer self-assembling process to thereby produce simulated DSA patterns, which are simulated contours of a constituent polymer of the DSA material. The operation 138 also takes inputs from the process model 170 that include parameters associated with the DSA process such as the characteristic length Lo, other parameters of the constituent polymers in the block copolymer, and parameters of DSA annealing processes.

The operation 139 (FIG. 2) simulates an etching process that uses the simulated DSA patterns as an etch mask to etch a patterning layer (e.g., a hard mask (HM) layer) on a wafer, thereby producing a simulated AEI pattern 500 (FIG. 3F). The simulated AEI pattern 500 includes a plurality of simulated AEI holes (or simulated HM features) 310 in the present embodiment. The AEI target holes 302 shown in FIG. 3F are for comparison purposes only and are not included in the simulated AEI pattern 500. The operation 139 also takes inputs from the process model 170 that include parameters associated with the etching process such as the etching selectivity between the self-assembled constituent polymers, the etching selectivity between the DSA patterns and the patterning layer, and the direction of etching.

The operation 140 (FIG. 2) compares the simulated AEI pattern 500 to the AEI target 122, including comparing the simulated AEI holes 310 to the AEI target holes 302. The comparison may include checking whether there is a one-to-one mapping relationship between the two. For example, it checks whether the number of simulated AEI holes 310 equals to the number of AEI target holes 302. The comparison may also include checking the relative positions of the two, whether there is overlapping between the two, and how much is the overlapping if any. In the present embodiment, the operation 140 may produce a comparison score indicating how closely the simulated AEI pattern 500 matches the AEI target 122.

The operation 141 (FIG. 2) determines if the simulated AEI pattern 500 is acceptable. In other words, the operation 141 checks if the simulated AEI pattern 500 matches the AEI target 122 within an acceptable margin. In an embodiment, the determination is based on the comparison score produced by the operation 140 and a threshold. If the comparison score is better than the threshold, then the simulated AEI pattern 500 is acceptable. Otherwise, it is not acceptable. As shown in FIG. 3F, the simulated AEI holes 310 and the AEI target holes 302 are of different shapes. Specifically, the simulated AEI holes 310 are round, while the AEI target holes 302 are rectangular. This does not necessarily make the simulated AEI holes 310 unacceptable. For example, the simulated AEI holes 310 may have enough overlapping with the AEI target holes 302 to make them acceptable.

If the operation 141 determines that the simulated AEI pattern 500 is acceptable (such as shown in FIG. 3H), the operation 142 stores the OPC-modified ADI target pattern 300 in a tangible computer-readable medium, such as a floppy disc, a hard disc, an optical disk, a magneto-optical disc, a solid-state storage device, or other suitable storage medium. The computer-readable medium can be accessed by other IC processing stages such as the mask fabrication 144.

If the operation 141 determines that the simulated AEI pattern 500 is not acceptable, the operation 143 adjusts the ADI target patterns 304 (FIG. 3B) and goes back to the operation 135 in the present embodiment. The above operations repeat iteratively until the operation 141 determines that the simulated AEI pattern 500 is acceptable. The adjustment in the operation 143 may include moving the ADI target patterns 304 based on the comparison results of the operation 140. For example, if the simulated AEI holes 310 are found to be offset to the right (left, up, down) of the AEI target holes 302, then the operation 143 moves the ADI target patterns 304 left (right, down, up) so as to compensate the offset. In another embodiment, the adjustment in operation 143 includes stretching the corners of the ADI target patterns 304 (e.g., FIG. 3E), which affects the positioning of the DSA patterns. In yet another embodiment, the adjustment in operation 143 includes extending and/or shrinking some portions of the ADI target patterns 304, such as illustrated in FIG. 3G. In FIG. 3G, patterns within the dashed box 308 correspond to the ADI target pattern 300 of FIG. 3C, which is connected to other ADI target patterns to form a big net. As can be seen from FIG. 3G, some portions of the patterns 304 are extended or shrunk relative to those shown in FIG. 3C.

In another embodiment, outputs of the operation 143 are fed back to the operation 136 instead of the operation 135, although this is not illustrated in FIG. 2. In such embodiment, the assistant features 306 (FIG. 3C) remain in the pattern while the ADI target patterns 304 are moved, stretched, extended, and/or shrunk.

Figure 4:
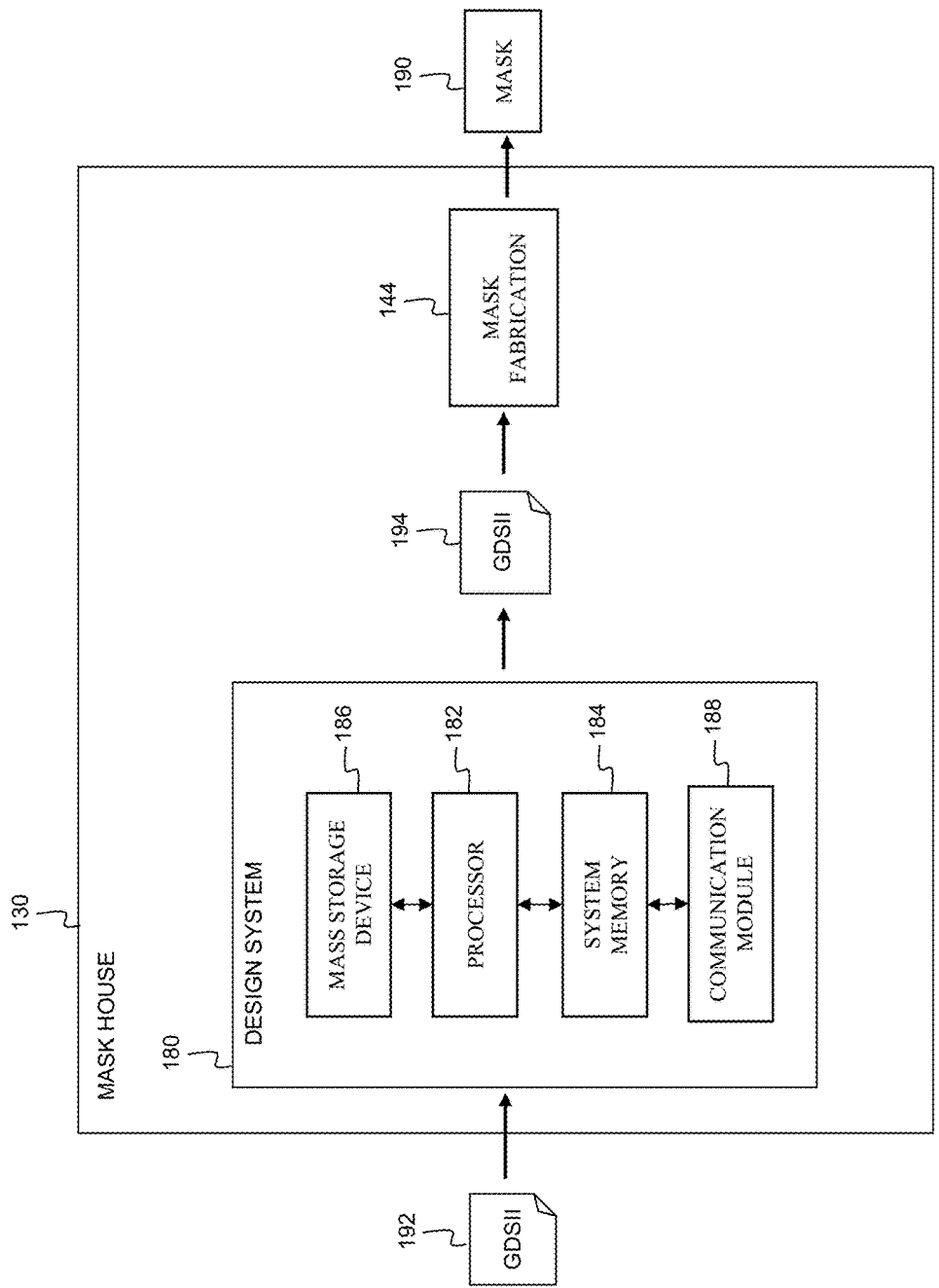
FIG. 4 is a more detailed block diagram of the Mask House in FIG. 1 that can execute operations of the DSA-aware design flow, in accordance with some embodiments.

FIG. 4 is a more detailed system diagram of the mask house 130 shown in FIGS. 1 and 2 according to various aspects of the present disclosure. In the illustrated embodiment, the mask house 130 includes a design system 180 that is operable to perform the functionality described in association with the DSA-aware data preparation 132 of FIGS. 1 and 2. The design system 180 is an information handling system such as a computer, server, workstation, or other suitable device. The design system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 186. Examples of mass storage devices may include hard discs, optical disks, magneto-optical discs, solid-state storage devices, and/or a variety other mass storage devices known in the art. The communication module 188 is operable to communicate information such as IC design layout files with the other components in the IC manufacturing system 100, such as design house 120. Examples of communication modules may include Ethernet cards, 802.11 WiFi devices, cellular data radios, and/or other suitable devices known in the art.

In operation, the design system 180 is configured to manipulate the IC design layout 122 according to a variety of design rules and limitations, including performing the operations 133-143 as described with reference to FIG. 2. For example, in an embodiment, the DSA-aware data preparation 132 may be implemented as software instructions executing on the design system 180. In such an embodiment, the design system 180 receives a first GDSII file 192 containing the target layout 122 (AEI target 122) from the design house 120. After the DSA-aware data preparation 132 completes, the design system 180 transmits a second GDSII file 194 containing an OPC-modified ADI target (e.g., having OPC patterns 304' and 306') to the mask fabrication 144 which fabricates one or more masks 190. In alternative embodiments, the IC design layout may be transmitted between the components in IC manufacturing system 100 in alternate file formats such as DFII, CIF, OASIS, or any other suitable file type. It is understood that the design system 180 and the mask house 130 may include additional and/or different components in alternative embodiments.

Figure 5:
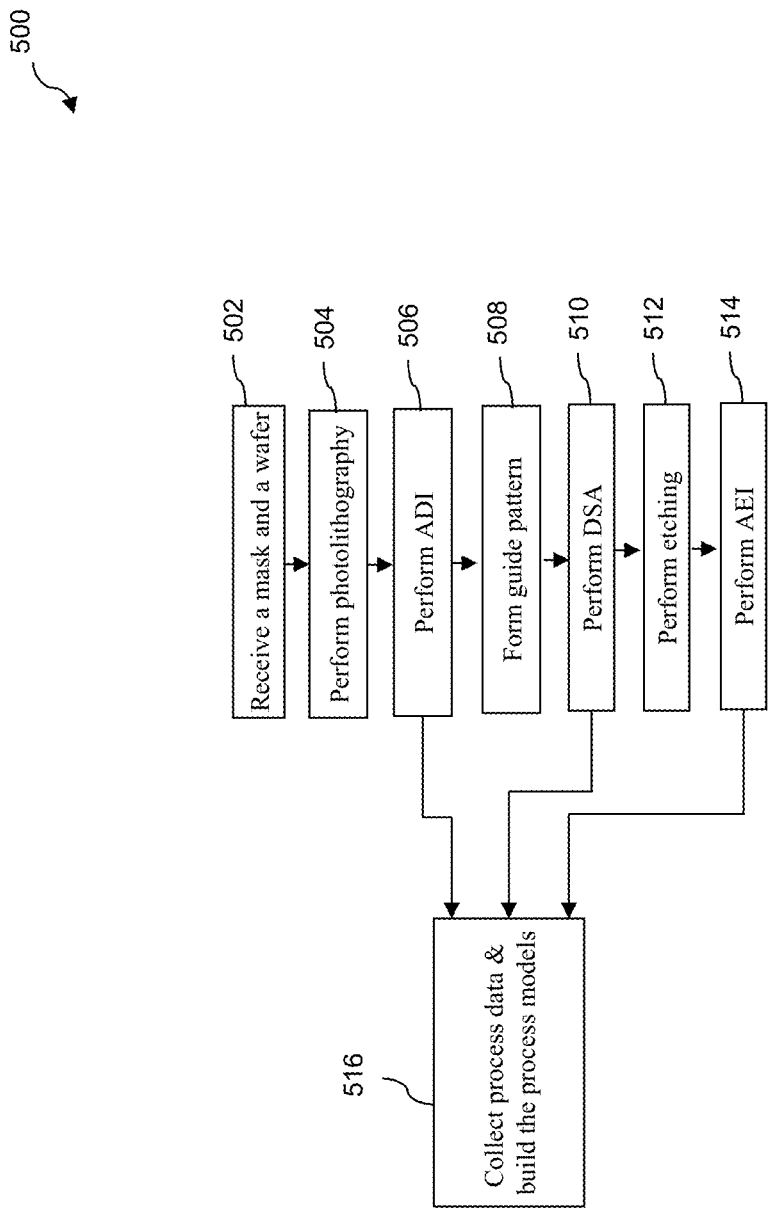
FIG. 5 illustrates a flow chart of operations that are performed by the Fab in FIG. 1, in accordance with some embodiments.

FIG. 5 shows a flow chart of a method 500 that may be implemented by the fab 150 (FIG. 1), according to aspects of the present disclosure. The method 500 is merely an example, and is not intended to limit the present disclosure beyond what is explicitly recited in the claims. Additional operations can be provided before, during, and after the method 500, and some operations described can be replaced, eliminated, or moved around for additional embodiments of the method. The method 500 is briefly discussed below.

At operation 502, the method 500 receives a mask and a wafer. Particularly, the mask includes patterns that have been prepared by the mask house 130 using DSA-aware data preparation 132. The wafer may include a semiconductor substrate with various material layers formed thereon. The semiconductor substrate includes an elementary semiconductor (e.g., silicon or germanium), a compound semiconductor (e.g., silicon germanium, silicon carbide, gallium arsenic, indium arsenide, gallium nitride, and indium phosphide), or an alloy semiconductor, such as silicon germanium carbide, gallium arsenic phosphide, and gallium indium phosphide. The various material layers may include epitaxial layers, dielectric layers, and/or hard mask layers. Particularly, the various material layers include a patterning layer which may include a dielectric material such as silicon oxide, silicon nitride, or a low-k or extreme low-k material.

At operation 504, the method 500 performs a photolithography process using the mask and the wafer. For example, the operation 504 may spin-coat a photoresist layer over the wafer, expose the photoresist layer to a radiation source using the mask, and perform post-exposure baking and developing to form a resist pattern.

At operation 506, the method 500 performs after-development-inspection (ADI) to the resist pattern. The contour of the resist pattern may closely match the simulated contour 400 (FIG. 3E). At operation 508, the method 500 forms a guide pattern by transferring the resist pattern to the patterning layer on the wafer. The operation 508 may include dry etching, wet etching, or other suitable etching processes.

At operation 510, the method 500 performs a DSA process. This may include depositing a block copolymer (BCP) into trenches in the patterning layer, and induce microphase separation in the BCP to segregate constituent polymers by heating, cooling, introduction of a solvent, application of a magnetic field, and/or other techniques. The BCP may be selected from the group consisting of poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl(meth)acrylate), poly(methyl methacrylate-b-t-butyl methacrylate), poly(ethylene oxide-b-propylene oxide), poly(styrene-b-tetrahydrofuran), and combinations of the foregoing block copolymers.

At operation 512, the method 500 performs an etching process to remove one of the constituent polymers, leaving the remaining constituent polymer as DSA patterns over the wafer. One example DSA pattern is small-sized cylindrical pattern suitable for forming contact holes or via holes. At operation 512, the method 500 further etches the wafer using the DSA patterns as an etch mask to form circuit features, such as contact holes. At operation 514, the method 500 performs after-etching-inspection to the circuit features formed by the operation 512.

The method 500 includes an operation 516 that collects process data from various steps of the method 500 including operations 506, 510, and 514. The operation 516 may also build process models from the collected process data. These process models can be included as part of the process models 170 (FIG. 2).

Although not intended to be limiting, one or more embodiments of the present disclosure provide many benefits to the manufacturing of a semiconductor device. For example, embodiments of the present disclosure provide methods for optimizing a mask pattern with DSA awareness. For example, DSA-aware guide patterns (at the mask fabrication stage) are no longer restricted to conventional shapes and can be connected by sub-DSA resolution assistant features for improving both optical printability and pattern uniformity for DSA processes.

In one exemplary aspect, the present disclosure is directed to a method. The method includes receiving a first target pattern of an integrated circuit (IC), the first target pattern including two first target features and two second target features. The method further includes deriving a second target pattern based on the first target pattern and a directed self-assembly (DSA) process, wherein the first target pattern is to be produced by a process that includes performing the DSA process with a guide pattern derived from the second target pattern, wherein the second target pattern includes a third feature and a fourth feature, the third feature is designed for producing the two first target features with the DSA process, and the fourth feature is designed for producing the two second target features with the DSA process. The method further includes inserting one or more sub-DSA-resolution assistant features (SDRAF) into the second target pattern, the one or more SDRAF connecting the third and fourth features, wherein at least one of the deriving and the inserting is performed by a computer.

In some examples, the method further includes performing an optical proximity correction (OPC) to the second target pattern including the one or more SDRAF. In a further example, the method further includes, after the performing of the OPC, simulating a photolithography process with the second target pattern including the one or more SDRAF, resulting in a simulated contour of the second target pattern. In some embodiments, the method further includes simulating a DSA process using the simulated contour of the second target pattern as a guide pattern, resulting in simulated DSA patterns. In some embodiments, the method further includes simulating an etching process that transfers the simulated DSA patterns to a hard mask (HM), resulting in two first simulated HM features and two second simulated HM features. In some embodiments, the method further includes checking if the two first simulated HM features match the two first target features within a margin and the two second simulated HM features match the two second target features within the margin.

On condition that the checking is positive, the method may further include storing the second target pattern including the one or more SDRAF in a tangible computer-readable medium for use by an IC mask-making tool. The method may further include forming a mask using an IC layout having the second target pattern including the one or more SDRAF; performing the photolithography process to a wafer using the mask, resulting in a trench in a first layer of the wafer; performing the DSA process which includes depositing a DSA material into the trench and inducing microphase separation within the DSA material thereby defining a constituent polymer; and etching a hard mask (HM) layer on the wafer using the constituent polymer as an etch mask.

On condition that the checking is negative, the method may further include adjusting one of size, position, and shape of the third and fourth features to compensate mismatch between the two first simulated HM features and the two first target features and between the two second simulated HM features and the two second target features. The method may further include repeating the steps of performing the OPC, simulating the photolithography process, simulating the DSA process, simulating the etching process, and checking.

In some embodiments of the method, a distance between centers of the two first target features is within 95% to 105% of a characteristic length of a DSA material used by the DSA process, and another distance between centers of the two second target features is within 95% to 105% of the characteristic length of the DSA material.

In some embodiments of the method, a first line crossing centers of the two first target features and a second line crossing centers of the two second target features form an acute angle.

In another exemplary aspect, the present disclosure is directed to a method. The method includes receiving an after-etching-inspection (AEI) target pattern of an integrated circuit (IC); and deriving an after-development-inspection (ADI) target pattern based on the AEI target pattern and a directed self-assembly (DSA) process, wherein the AEI target pattern is to be produced by a process that includes performing the DSA process with a guide pattern derived from the ADI target pattern, wherein the ADI target pattern includes a plurality of ADI target features. The method further includes inserting one or more assistant features into the ADI target pattern to connect the ADI target features, wherein each of the one or more assistant features has a width that is less than half of a characteristic length of a DSA material to be used by the DSA process, wherein at least one of the deriving and the inserting is performed by a computer.

In some embodiments, the method further includes performing an optical proximity correction (OPC) to the ADI target pattern including the one or more assistant features. In some embodiments, the method further includes simulating a photolithography process with the ADI target pattern including the one or more assistant features, resulting in a simulated contour of the ADI target pattern. In a further embodiment, the method may include simulating a DSA process using parameters of the DSA material and the simulated contour of the ADI target pattern as a guide pattern, resulting in a simulated contour of a constituent polymer of the DSA material. The method may further include simulating an etching process that transfers the simulated contour of the constituent polymer to a patterning layer, resulting in a simulated AEI pattern. The method may further include checking if the simulated AEI pattern matches the AEI target pattern.

In another exemplary aspect, the present disclosure is directed to a method. The method includes receiving an after-etching-inspection (AEI) target pattern of an integrated circuit (IC); and deriving an after-development-inspection (ADI) target pattern based on the AEI target pattern and a directed self-assembly (DSA) process, wherein the AEI target pattern is to be produced by a process that includes performing the DSA process with a guide pattern derived from the ADI target pattern, wherein the ADI target pattern includes a plurality of ADI target features. The method further includes inserting one or more sub-DSA-resolution assistant features (SDRAF) into the ADI target pattern to connect the ADI target features; and performing an optical proximity correction (OPC) to the ADI target pattern including the one or more SDRAF, resulting in an OPC-modified ADI target pattern, wherein at least one of the deriving, the inserting, and the performing of the OPC is performed by a computer.

In some embodiments, the method further includes simulating a photolithography process with the OPC-modified ADI target pattern, resulting in a simulated ADI contour; simulating the DSA process using the simulated ADI contour as a guide pattern, resulting in a simulated DSA pattern; and simulating an etching process that transfers the simulated DSA pattern to a patterning layer, resulting in a simulated AEI pattern. The method may further include checking if the simulated AEI pattern matches the AEI target pattern within a margin. If the simulated AEI pattern matches the AEI target pattern within the margin, the method may further include storing the OPC-modified ADI target pattern into a tangible computer-readable medium.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a first target pattern of an integrated circuit (IC), the first target pattern including two first target features and two second target features;
deriving a second target pattern based on the first target pattern and a directed self-assembly (DSA) process, wherein the second target pattern includes a third feature and a fourth feature, the third feature is designed for producing the two first target features with the DSA process, and the fourth feature is designed for producing the two second target features with the DSA process; and
inserting one or more sub-DSA-resolution assistant features (SDRAF) into the second target pattern, the one or more SDRAF connecting the third and fourth features, wherein at least one of the deriving and the inserting is performed by a computer.

2. The method of claim 1, further comprising:
performing an optical proximity correction (OPC) to the second target pattern including the one or more SDRAF.

3. The method of claim 2, after the performing of the OPC, further comprising:
simulating a photolithography process with the second target pattern including the one or more SDRAF, resulting in a simulated contour of the second target pattern.

4. The method of claim 3, further comprising:
simulating a DSA process using the simulated contour of the second target pattern as a guide pattern, resulting in simulated DSA patterns.

5. The method of claim 4, further comprising:
simulating an etching process that transfers the simulated DSA patterns to a hard mask (HM), resulting in two first simulated HM features and two second simulated HM features.

6. The method of claim 5, further comprising:
checking if the two first simulated HM features match the two first target features within a margin and the two second simulated HM features match the two second target features within the margin.

7. The method of claim 6, further comprising:
on condition that the checking is positive, storing the second target pattern including the one or more SDRAF in a tangible computer-readable medium for use by an IC mask-making tool.

8. The method of claim 7, further comprising:
forming a mask using an IC layout having the second target pattern including the one or more SDRAF;
performing the photolithography process to a wafer using the mask, resulting in a trench in a first layer of the wafer;
performing the DSA process which includes:
depositing a DSA material into the trench; and
inducing microphase separation within the DSA material thereby defining a constituent polymer; and
etching a hard mask (HM) layer on the wafer using the constituent polymer as an etch mask.

9. The method of claim 6, further comprising:
on condition that the checking is negative, adjusting one of size, position, and shape of the third and fourth features to compensate mismatch between the two first simulated HM features and the two first target features and between the two second simulated HM features and the two second target features; and
repeating the steps of performing the OPC, simulating the photolithography process, simulating the DSA process, simulating the etching process, and checking.

10. The method of claim 1, wherein a distance between centers of the two first target features is within 95% to 105% of a characteristic length of a DSA material used by the DSA process, and another distance between centers of the two second target features is within 95% to 105% of the characteristic length of the DSA material.

11. The method of claim 1, wherein a first line crossing centers of the two first target features and a second line crossing centers of the two second target features form an acute angle.

12. A method comprising:
receiving an after-etching-inspection (AEI) target pattern of an integrated circuit (IC);
deriving an after-development-inspection (ADI) target pattern based on the AEI target pattern and a directed self-assembly (DSA) process, wherein the ADI target pattern includes a plurality of ADI target features; and
inserting one or more assistant features into the ADI target pattern to connect the ADI target features, wherein each of the one or more assistant features has a width that is less than half of a characteristic length of a DSA material to be used by the DSA process, wherein at least one of the deriving and the inserting is performed by a computer.

13. The method of claim 12, further comprising:
performing an optical proximity correction (OPC) to the ADI target pattern including the one or more assistant features.

14. The method of claim 12, further comprising:
simulating a photolithography process with the ADI target pattern including the one or more assistant features, resulting in a simulated contour of the ADI target pattern.

15. The method of claim 14, further comprising:
simulating a DSA process using parameters of the DSA material and the simulated contour of the ADI target pattern as a guide pattern, resulting in a simulated contour of a constituent polymer of the DSA material.

16. The method of claim 15, further comprising:
simulating an etching process that transfers the simulated contour of the constituent polymer to a patterning layer, resulting in a simulated AEI pattern.

17. The method of claim 16, further comprising:
checking if the simulated AEI pattern matches the AEI target pattern.

18. A method comprising:
receiving an after-etching-inspection (AEI) target pattern of an integrated circuit (IC);
deriving an after-development-inspection (ADI) target pattern based on the AEI target pattern and a directed self-assembly (DSA) process, wherein the ADI target pattern includes a plurality of ADI target features;

inserting one or more sub-DSA-resolution assistant features (SDRAF) into the ADI target pattern to connect the ADI target features; and performing an optical proximity correction (OPC) to the ADI target pattern including the one or more SDRAF, resulting in an OPC-modified ADI target pattern, wherein at least one of the deriving, the inserting, and the performing of the OPC is performed by a computer.

19. The method of claim 18, further comprising:

simulating a photolithography process with the OPC-modified ADI target pattern, resulting in a simulated ADI contour;

simulating the DSA process using the simulated ADI contour as a guide pattern, resulting in a simulated DSA pattern; and simulating an etching process that transfers the simulated DSA pattern to a patterning layer, resulting in a simulated AEI pattern.

20. The method of claim 19, further comprising:

checking if the simulated AEI pattern matches the AEI target pattern within a margin; and if the simulated AEI pattern matches the AEI target pattern within the margin, storing the OPC-modified ADI target pattern into a tangible computer-readable medium.

* * * * *